US010803665B1

(12) United States Patent
Patel

(10) Patent No.: US 10,803,665 B1
(45) Date of Patent: Oct. 13, 2020

(54) DATA AGGREGATION FOR AUGMENTED REALITY APPLICATIONS

(71) Applicant: Amazon Technologies, Inc., Reno, NV (US)

(72) Inventor: Pratik Patel, San Mateo, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/716,062

(22) Filed: Sep. 26, 2017

(51) Int. Cl.
| | | |
|---|---|---|
| G06T 19/00 | (2011.01) | |
| G06T 7/73 | (2017.01) | |
| G06T 7/50 | (2017.01) | |
| A63F 13/25 | (2014.01) | |
| A63F 13/213 | (2014.01) | |
| A63F 13/211 | (2014.01) | |
| A63F 13/73 | (2014.01) | |
| A63F 13/52 | (2014.01) | |
| A63F 13/216 | (2014.01) | |
| G06K 9/00 | (2006.01) | |
| H04N 5/445 | (2011.01) | |

(52) U.S. Cl.
CPC .......... *G06T 19/006* (2013.01); *A63F 13/211* (2014.09); *A63F 13/213* (2014.09); *A63F 13/216* (2014.09); *A63F 13/25* (2014.09); *A63F 13/52* (2014.09); *A63F 13/73* (2014.09); *G06T 7/50* (2017.01); *G06T 7/73* (2017.01); *G06K 9/00671* (2013.01); *G06T 2219/024* (2013.01); *H04N 5/44504* (2013.01)

(58) Field of Classification Search
CPC .......... G06T 19/006; G06T 7/50; G06T 7/73; G06T 2219/024; A63F 13/213; A63F 13/211; A63F 13/52; A63F 13/216; A63F 13/25; A63F 13/73; G06K 9/00671; H04N 5/44504
See application file for complete search history.

(56) References Cited

U.S. PATENT DOCUMENTS

| | | | | |
|---|---|---|---|---|
| 8,880,584 | B2 * | 11/2014 | Xu ....................... | G06Q 10/10 709/203 |
| 2009/0136125 | A1 * | 5/2009 | Fujita ................. | G06K 9/00791 382/165 |
| 2011/0199479 | A1 * | 8/2011 | Waldman ........... | G01C 21/3602 348/116 |
| 2013/0201097 | A1 * | 8/2013 | Pasquero .............. | G06F 3/0488 345/156 |

(Continued)

*Primary Examiner* — Tapas Mazumder
(74) *Attorney, Agent, or Firm* — Hogan Lovells US, LLP

(57) ABSTRACT

Multiple devices executing an augmented reality (AR) application in a specific area can capture position data for objects in that area, which can be used to determine how to render the AR content. Since accuracy of this data falls off with distance, the data from the various devices can be collected by a dedicated server that can aggregate the position data to attempt to obtain a more accurate authoritative data set for the positions of objects and features in the area. At least relevant portions of the authoritative data set are transmitted back the individual devices such that the devices can use the more accurate data to render location- and scale-appropriate AR content over a live camera view captured by that device. Devices may receive data for the current field of view or other portions of the authoritative data set, as well as appropriate updates.

18 Claims, 9 Drawing Sheets

(56) References Cited

U.S. PATENT DOCUMENTS

| | | | | |
|---|---|---|---|---|
| 2015/0145891 A1* | 5/2015 | Kuffner | ............... | G06T 3/60 |
| | | | | 345/649 |
| 2015/0356872 A1* | 12/2015 | Atsmon | ............... | G08G 1/0112 |
| | | | | 701/522 |
| 2016/0069983 A1* | 3/2016 | Gonia | ............... | G01S 5/0205 |
| | | | | 455/456.1 |

\* cited by examiner

US 10,803,665 B1

DATA AGGREGATION FOR AUGMENTED REALITY APPLICATIONS

BACKGROUND

The widespread adoption of portable computing devices, such as smartphones and tablet computers, has resulted in a corresponding increase in the amount and types of electronic content available to players. This includes the providing of augmented reality (AR) content, where a device can capture video content of a location and a computing device can render content such that it appears, at least as displayed on a screen of the device, that the content exists in that location. As the computing device moves, the view of the content can change accordingly, being rendered as if the content corresponds to an actual three-dimensional object being captured by the camera of the device at the appropriate location and angle. Such rendering can be difficult, however, as conventional augmented reality applications require accurate data about the environment in order to render the content at an appropriate location with the appropriate scale and angle. Portable computing devices, such as smartphones, typically have a limited accuracy for items beyond a certain range, such that the data for further distances can be relatively noisy. This can result in inaccuracies in determinations of locations and surfaces, which can cause the augmented reality content to frequently jump in location or appearance, or otherwise simply not be accurately rendered with respect to the live camera view displayed on the display screen of the device.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the presentation of dynamically rendered content, such as augmented reality (AR) content. In particular, various approaches enable a dedicated server, or other such system or service, to collect position data from multiple devices rendering AR content through an application in a specific region, such as a gameplay arena. Each device will collect data within an accuracy range of the device, which can be determined to be accurate, and beyond the accuracy range, which can be considered as potentially inaccurate. The data can be aggregated such that the position data for locations outside the various accuracy ranges can have the accuracy improved based on comparing multiple measurements for similar features. An authoritative data set for the locations of objects or features in the region, or scene, can then be generated, and at least relevant portions of the data can be transmitted back the relevant devices. The devices can then use this data, along with the device-specific accurate position data for the accuracy range, to render location and scale-appropriate AR content over a live camera view captured by that device. In some embodiments the devices will only receive data for the current field of view, while in others the devices can receive the authoritative data set and updates to that set over time.

Various other functions can be implemented within the various embodiments as well as discussed and suggested elsewhere herein.

There can be various situations wherein it may be desirable to render or provide augmented reality (AR) content to viewers through a number of different devices. For example, multiple players might be playing a multiplayer game wherein AR content is displayed to each of the players through a respective computing device. As known for AR content, the view and content displayed on each device can be a function of the location of the device in at least some embodiments, as well as the orientation (or changes in orientation) of the respective device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

Figure 1A:
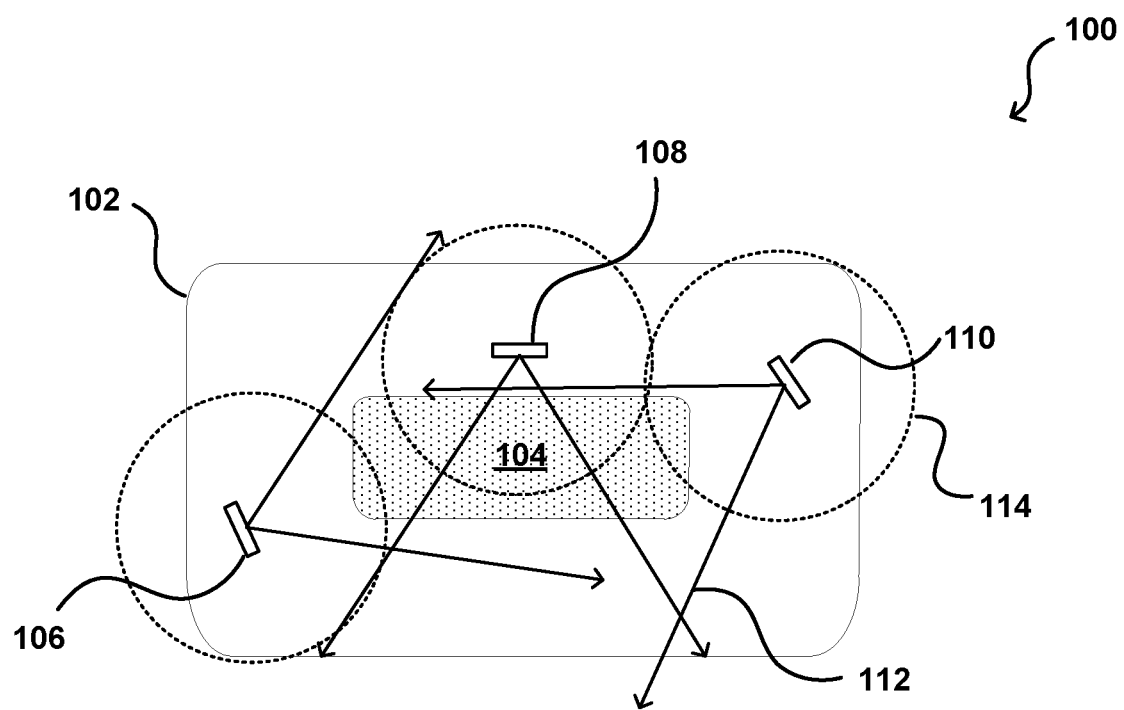
FIGS. 1A and 1B illustrate example regions of varying accuracy for multi-viewer augmented reality content that can be analyzed in accordance with various embodiments.

FIG. 1A illustrates a top-down view 100 of a gaming location that can be utilized in accordance with various embodiments. This particular location corresponds to a closed or otherwise defined space 102, such as may correspond to a warehouse or arena. Within this space 102 is a defined gameplay field 104. This may correspond to, for example, a race track, sporting field, or fighting arena, among other such options. It should be understood that the gameplay field 104 can be real and/or virtual, such as may correspond to an actual physical space having physical components, or can correspond to a determined region of the floor (or another such surface or area) where the field is virtual and only displayed through augmented reality content, among other such options. In this example there are three players, or viewers, each viewing augmented reality content in the game field 104 using a respective augmented reality device 106, 108, 110. These devices can be any appropriate content capable of displaying augmented reality content, such as may include smart phones, tablet computers, smart glasses or contacts, and the like. In some embodiments the AR content will be rendered over a live camera view captured by the device and displayed on a display screen, such as on a smart phone, but in other embodiments the content may be displayed over an actual view, such as for smart glasses. In various embodiments the devices will have at least some type of position and/or orientation determination mechanism, such as a global positioning system (GPS) sensor or electronic gyroscope, which can enable the view to be determined in such a way as to render the AR content with an appropriate angle, scale, and rotation, etc.

As illustrated in FIG. 1A, each device has a respective field of view 112 that corresponds to a specific portion of the game field 104. For each device, only AR content corresponding to locations within that field of view will be rendered and displayed, at any given time, by a display of that device. In order to determine the angle and scale, as well as the point of reference for the field of view, the location of the device can also be determined. As mentioned, this can be determined using a GPS-based approach, or can use an iBeacon or triangulation-based approach, among others known or used for device location determination. The location information can help to determine the location of each device in the space, with respect to the gameplay field 104, and with respect to the other devices 106, 108, 110.

In order to make the AR content appear to be as realistic as possible, it can be desirable in many situations to further cause the rendered objects to appear to be positioned on, or with respect to, actual surfaces in the gameplay field 104. This can include, for example, being positioned on a track, field surface, tabletop, or other object or element (physical or virtual) in the gameplay field. Further, it can be desirable that these objects are all of the appropriate scale and location with respect to each other, and that these relationships remain consistent unless intentionally varied within the game or content presentation. In order to provide such functionality, it can be desirable to map, model, or otherwise generate an accurate representation of the gameplay field 104, so that the content can be rendered appropriately with respect to that representation. While in some instances the field 104 may be a fixed and well-known set of objects that does not change, in other instances the field may not be well known or may be able to vary throughout the game. In other embodiments the position and/or orientation of a respective device may be unable to be determined with sufficient accuracy to prevent any noise or error from being injected into the AR content as rendered.

It therefore can be desirable in at least some embodiments to determine the distance to various objects, locations, surfaces, and/or points in the gameplay field, or other appropriate area, for each individual device, such that the AR content is rendered and displayed appropriately for that specific device based on the current location and orientation. This can include, for example, capturing image data using a rear facing camera and analyzing that image data using a computer vision algorithm to identify the locations of specific types of surfaces, shapes, points, objects, or other such elements in the scene. Various algorithms can attempt to recognize various feature and/or anchor points which can be used to identify surfaces, for example, which can be used as a reference for rendering AR content. Various other approaches can be used as well, as may include structured lighting, stereoscopic imaging, ultrasonic image, LIDAR scanning, and the like. Many portable computing devices or other consumer electronics may not have these and other such sensors or mechanisms, and thus may need to rely upon cameras or more basic data capture mechanisms.

While the various types of sensors and devices have different accuracies and benefits, each can have a limited range over which the location data is accurate. For example, a smart phone using camera-based detection may be able to provide accurate position data up to about 10-15 feet (or 3-5 meters, etc.), but accuracy tends to decrease with distance. For locations beyond that distance, the data may be quite noisy. Using this data as a reference for rendering AR content can result in the AR content being jittery, as the reference location may not be stable or consistent, or being unrealistic for not being rendered in a proper location, or with a proper scale or angle, etc. Various types of portable devices will have limited accuracy when attempting to determine distance to various features through such mechanisms, which can thus prevent the AR experience from being as realistic or enjoyable as would otherwise be possible.

Accordingly, approaches in accordance with various embodiments can improve the location determinations for various gameplay elements by aggregating the data from multiple devices. Each device will be accurate for up to a given distance around its location, such that accurate data can be obtained for locations near any of the participating devices. Further, the location data for other points can be aggregated from the various devices in order to obtain more accurate and less noisy determinations, which can further be smoothed over time. In some embodiments a central server or other such computing system can receive the point data for a location and determine authoritative locations for each surface to be used as a reference for the AR content. The server can then generate polygonal elements that can be transmitted to each device based on its location and orientation, for example, such that the device can use the polygonal elements as a reference for rendering the appropriate AR content. The server can also send point cloud or other types of data, and the point data can be shared between devices without a central server as well, among other such options as discussed and suggested herein.

Figure 1B:
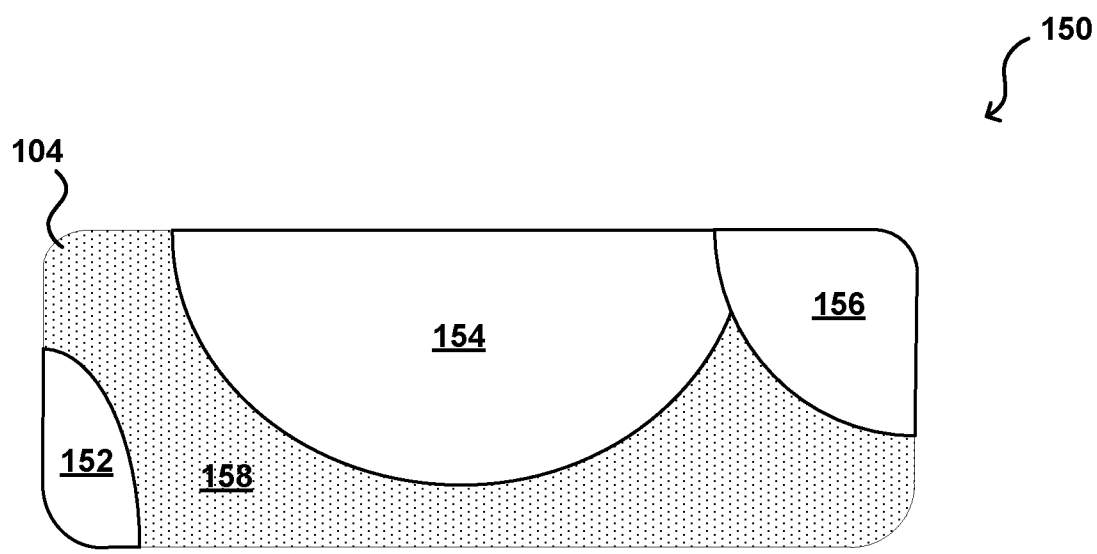

FIG. 1B illustrates a zoomed top-down view 150 of the gameplay field 104 of FIG. 1A. It should be understood that references may be carried over between figures for similar elements for simplicity of explanation, but that such usage should not be considered as a limitation on the scope of the various embodiments unless otherwise specifically stated. In this example, there are regions where the data captured by one of the devices should be fairly accurate based upon the proximity of the regions to the respective device. For example, a first region 152 of the gameplay field 104 is within an accuracy distance of the first device 106, a second region 154 of the gameplay field 104 is within an accuracy distance of the second device 108, and a third region 156 is within an accuracy distance of the third device. The accuracy distances can be the same for all devices, such as anything within ten feet of a device, or can vary by the type or capabilities of the device. Further, the accuracy distances can be static or can be determined dynamically based at least in part upon determined or observed errors or confidence values, etc. The distances can advantageously be determined dynamically, as the accuracy of the information can be impacted by factors such as brightness and lighting of the objects in the scene, among other such factors.

In some embodiments the position (or other relevant) data captured or determined by the various devices can be aggregated and analyzed for each region of the gameplay field 104. In this example, however, the accurate data captured by each device can be used in order to conserve resources on the various devices. Thus, information for the high accuracy regions 152, 154, 156 can be shared amongst the various devices, or used by a central server or other such system, to determine the authoritative position data for those regions. For a region 158 of the gameplay field 104 that is outside the various high accuracy regions, the data from the various devices can be aggregated and analyzed in order to attempt to derive a relatively accurate overview of the locations and surfaces in that region 158. This can include, for example, using a smoothing function to minimize changes over time. Since there may be a reasonable amount of noise in the data for this region, aggregating (i.e., averaging or otherwise combining) the values from some or all of the devices can help to average out the individual occurrences of noise. Using a smoothing function can further help to reduce the impact of noise, and resulting variation in AR rendering positions. In some embodiments further limitations can be utilized to assist in improving accuracy. For example, the data from the various devices can be weighted based on distance, such that data for further away positions that is likely to be less accurate will be weighted less than data for closer positions. In some embodiments there may be a data consideration threshold, beyond which data will not be considered as its accuracy will be below an acceptable level, or the amount of noise will be above an acceptable level, etc. The data can also be considered over time using the smoothing function, and in some instances single data points that exceed a maximum variation threshold (e.g., a change percentage or distance threshold) may be excluded from consideration in order to reduce the impact of extremely noisy or spurious data points.

Figure 2A:
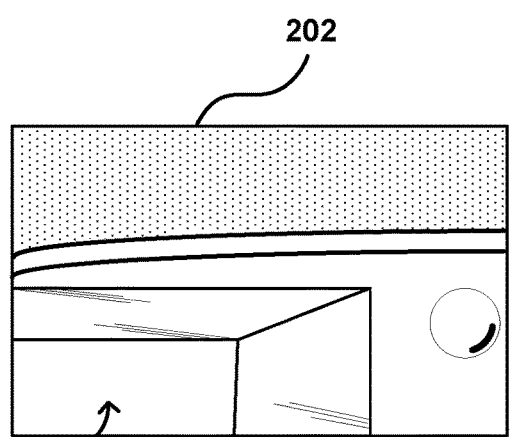
FIGS. 2A, 2B, 2C, and 2D illustrate an example approach to utilizing a point cloud for rendering augmented reality content that can be utilized in accordance with various embodiments.
Figure 2B:
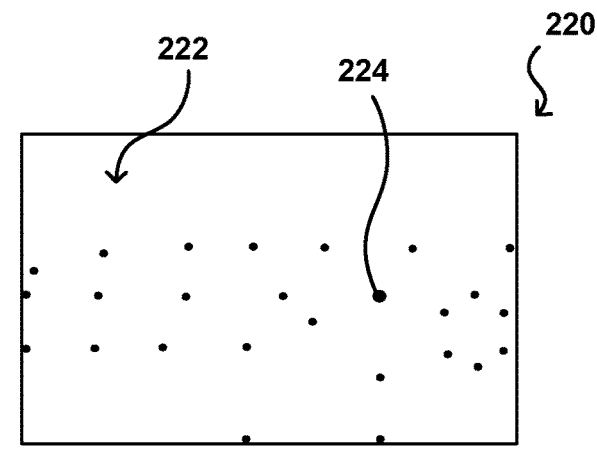

In various embodiments, the data to be analyzed from the various devices will correspond to positions of features detected from image or other data captured using a camera or other such sensor or component on each respective device. As illustrated in the example image 200 of FIG. 2A, for a given device image data may be captured that includes representations of various objects within a field of view of the camera or sensor, etc. In at least some embodiments, computer vision algorithms can be used to attempt to recognize objects, or at least differentiate between objects, in the image data and generate or determine representative data points. These points can correspond to unique or representative features, as known for computer vision applications. For a given image, a set of points can be generated as illustrated in the point set 220 of FIG. 2B, where the points can include feature points 222 and various anchor points 224, which can be used to identify specific objects in the scene. As known for various AR applications, anchor points can be used to identify surfaces or other contours or regions respect to which an AR element can be rendered. In various embodiments, each data point in the point set 220 can have coordinate data determined with respect to the device, such as an (x, y, z) or other coordinate set in two or three dimensions, which can be determined with respect to an axis having an origin at the sensor of the device. For example, an x value of 2.1 feet can correspond to 2.1 feet along the x direction from a camera sensor. In order to correlate the data from the various devices, the relative position and orientation of the devices can be determined. For example, the position data from FIG. 2B can be correlated to the gameplay field in FIG. 1A based on the determined position and orientation of the device as determined with respect to the gameplay field. Similar points than then be correlated, and an authoritative position for each point or object determined based on the correlated data. Approaches for correlating data sets and position from multiple angles are known in the art and, as such, will not be discussed herein in detail. The approaches for determining the positions of the data points in the gameplay field (or other region) using the position and orientation of the respective device capturing that data can be solved using conventional geometric approaches as discussed and suggested herein.

Figure 2C:
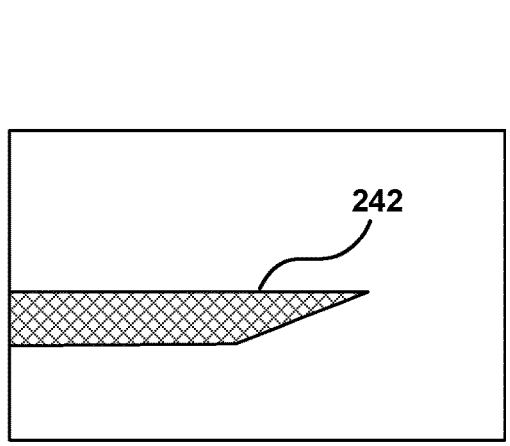
Figure 2D:
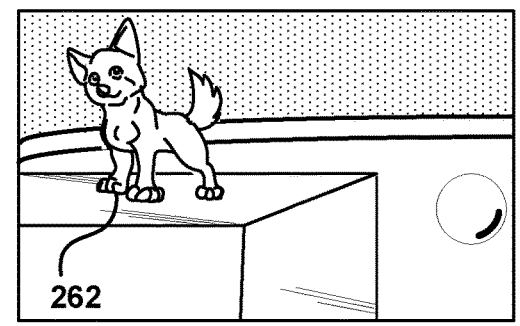

For various AR applications, it can be desirable to locate various surfaces, contours, or objects that can be used as reference points for rendering AR content. For example, various embodiments can attempt to locate surfaces, particularly relatively smooth and horizontal surfaces, that can serve as positioning locations for AR content. As an example, the data points from FIG. 2B (and potentially as aggregated or processed as discussed herein) can be analyzed to determine that there is a horizontal surface represented in the data. This can correspond to the box 204 or other such object represented in the image data. In response to detecting such a surface, and in some embodiments ensuring that various criteria are satisfied as may relate to size, angle, or smoothness, etc., a polygon 242 or other geometric shape or construct can be generated as illustrated in the example 240 of FIG. 2C. Information (e.g., coordinates) for this geometric construct can be determined on the device, or sent to the device, and used for placing rendered AR content. Sending geometric construct data can require much less bandwidth and memory than a full point cloud for a region, although in some embodiments point clouds can be used as well, or in place of the constructs. The constructs can have position and anchor points, for example, which can be used to define the location and shape of the construct. This relatively lightweight construct, definable using a relatively small set of points, allows for rapid adjustment in relative positioning based upon movement of a respective viewing device. This construct can be used as a reference for rendering AR content. As illustrated in the example image 260 of FIG. 2D, a live view of the gameplay field is displayed as captured by the camera. Based at least in part upon the position of the geometric construct, which would typically not actually be displayed on the screen but maintained as data in memory, can be used as a reference to render a character 262 or other AR element as an overlay with respect to the live view. As the device displayed the content changes position or orientation, the respective position of the geometric construct will change as well. This change can trigger a corresponding change in the rendering of the AR element 262, to maintain a consistent scale, position, and angle with respect to the geometric construct. In this example, the AR content can be rendered such that the dog is displayed to be standing on the box whenever the box is contained in (or near) a field of view of the camera of the device. While the dog or other character can move and perform various actions, its position in the gameplay field (or other such area) can be tracked with respect to at least one anchor point or construct, such that the rendering is consistent not only for a single device but across all devices accessing the AR content for that session and at or near that location.

Figure 3:
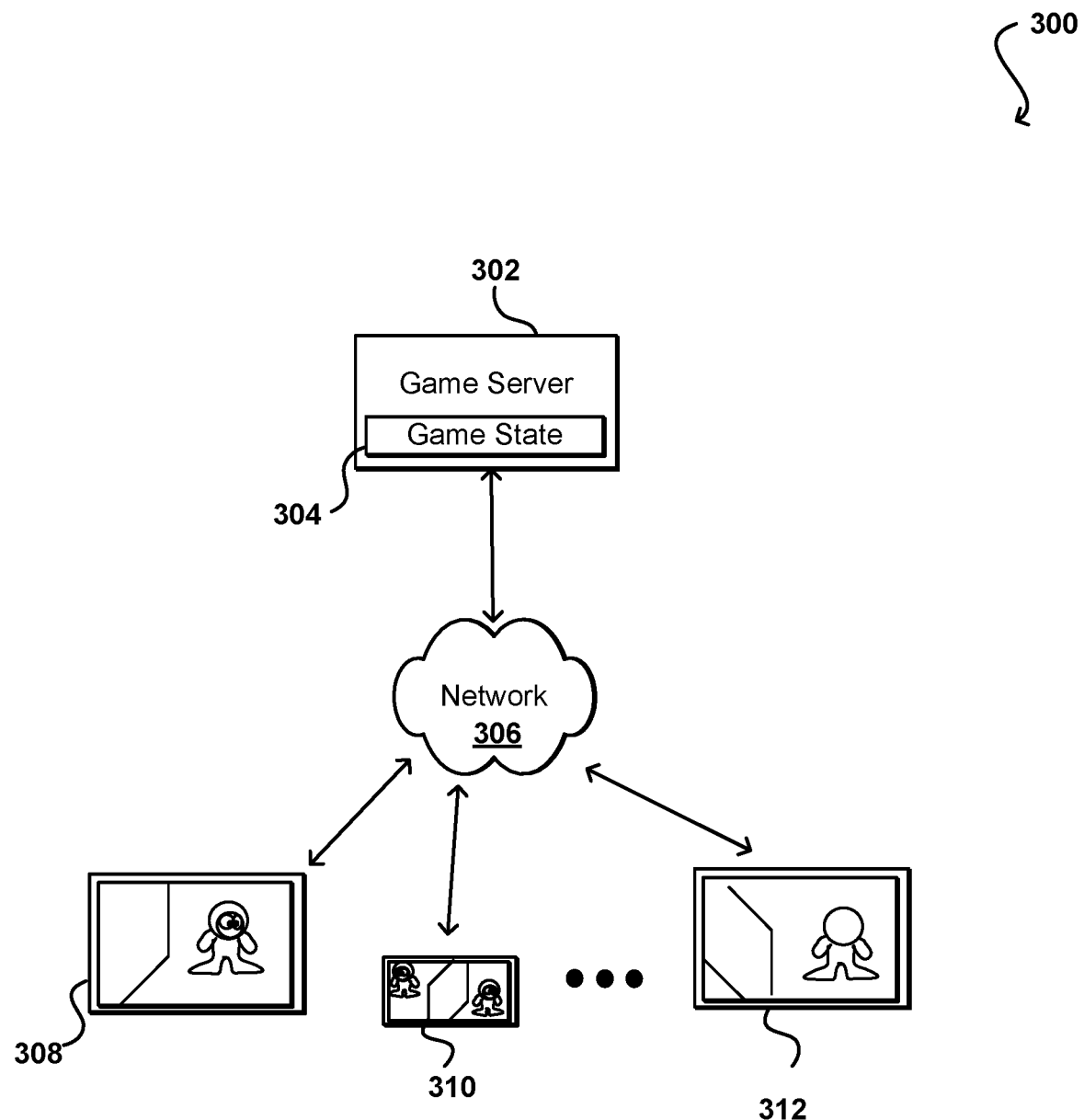
FIG. 3 illustrates players to a multiplayer online gaming session that can be developed in accordance with various embodiments.

As mentioned, in some embodiments this data can pass be sent from the various devices 380, 310, 312 for an AR session to a central server 302, or other such system or service, as illustrated in the example system 300 of FIG. 3. While a game server is discussed in this example, it should be understood that any server dedicated or allocated to an AR-inclusive session can be utilized as well within the scope of the various embodiments. In this example, a gaming application is hosted on at least one game server 302. The game server 302 can be a local gaming machine or a remote server operated by a game provider, among other such options. In this example the game offers multiplayer capability, whereby multiple players can utilize respective devices 308, 310, 312 to connect to the game server 302 over at least one network 306, such as the Internet, a local area network, a dedicated gaming network, a peer-to-peer network, or a cellular network, among other such options and combinations thereof. The players can join in a session of the game with state data that is managed by a game state component 304 of the game server. In some embodiments one or more game servers 302 can execute the game, while in others the servers can manage game state for instances of the game executing on the various player devices 308, 310, 312. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 302 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices. This can include, for example, maintaining an authoritative point cloud, set of position information, or set of geometric constructs for a gameplay region, such as a room, area, or arena as discussed herein. The server 302 can build up this information using data received from the various devices, and update the information based on updates to the received data. The server can maintain this point or construct data as part of the stored game state 304, and can send the information across the appropriate network(s) 306 to the various devices as appropriate, such as may be based upon the location and orientation of the device, and the corresponding field of view for which AR content can be rendered. In other embodiments, however, the position or construct data can be sent between devices independent of the game server 302, either through the network 306 or directly using a local communication protocol (e.g., Bluetooth or NFC). In situations where the data is sent between devices, the devices can either agree upon an authoritative data set or make local determinations for local rendering on the respective devices, among other such options.

In the example configuration of FIG. 3, the various devices can capture and analyze image or sensor data to generate point cloud and/or hit point test results, which can then be sent over the network(s) 306 to the dedicated server 302. The server can aggregate the data, based at least in part upon timestamps for the data as well as the relative locations and orientations of the respective devices. In at least some embodiments the positions can be geo-locations, while in other embodiments the locations can be with respect to a determined anchor or reference point in the gameplay area, among other such options. The server can utilize this aggregated data to generate an accurate impression of the gameplay (or other relevant) area, which can be maintained in a point cloud, model, set of geometric constructs, or other such representation. The server 302 can then relay some or all of this information to the various connected devices 308, 310, 312 that are involved in a session for an augmented reality application, game, or other presentation. The data can be sent for the entire area, and updated as appropriate, or can be sent as needed based upon the field of view of the device and the respective portion of the area to be used for AR rendering. As mentioned, such an approach can be used in games by using the aggregated data to render a scene in an environment that would be too large for one device to handle, and updating the rendered content based on both movement of the devices and a change in state of the game. A similar approach can be used for non-gaming applications, such as for informational or shopping presentations, where the AR content can be rendered and updated using a similar approach.

While discussed with respect to gaming, various other AR applications can take advantage of improved accuracy in position and other such determinations as well. For example, in a sporting event such an approach can be used to render information on a track or playing surface. In a store, such information can be used to render pricing or product information, views of persons or characters wearing or using various products, etc. For tourism, such an approach can be used to render information or characters in various locations, in order to provide information about the location or site. Various other approaches can be used as well, in situations where it is desired to render at least some amount of AR content, but the size of the space is too large for any single device to accurately map or determine the position and other distant information.

Such an approach can provide the benefit that rendering can be performed relatively well on conventional computing devices, but the accurate capture and determination of position information for nearby objects can be difficult and resource intensive, and can only be relatively successful for many devices. While transmitting and receiving position data can introduce some amount of latency, and consume some amount of bandwidth or data transmission, the impact can be minimal due to the type of data transmitted and the fact that for most device motions the change in view will not exceed the latency, such that small variations can be handled using the data already stored by the device. A server, with its significantly greater capacity, can quickly generate a more accurate point cloud for the respective area and send that point data to the devices. In some embodiments this can involve sending only the delta information, as much of the information will not change between display frames or will only change upon a change in game state. Further, once the majority of the point cloud data for a region has been transmitted to a device, such as for the interior of a stadium, there may be very few changes to the cloud made, and the orientation of the device can be used to determine the appropriate rendering location, angle, etc. Thus, while in some embodiments the server may generate an authoritative rendering for the AR content and send the relative portions down to the devices, in others the server may send the relevant position, geometric constraint, and/or anchor data for use by the individual devices in rendering the relevant portion locally.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

Figure 4:
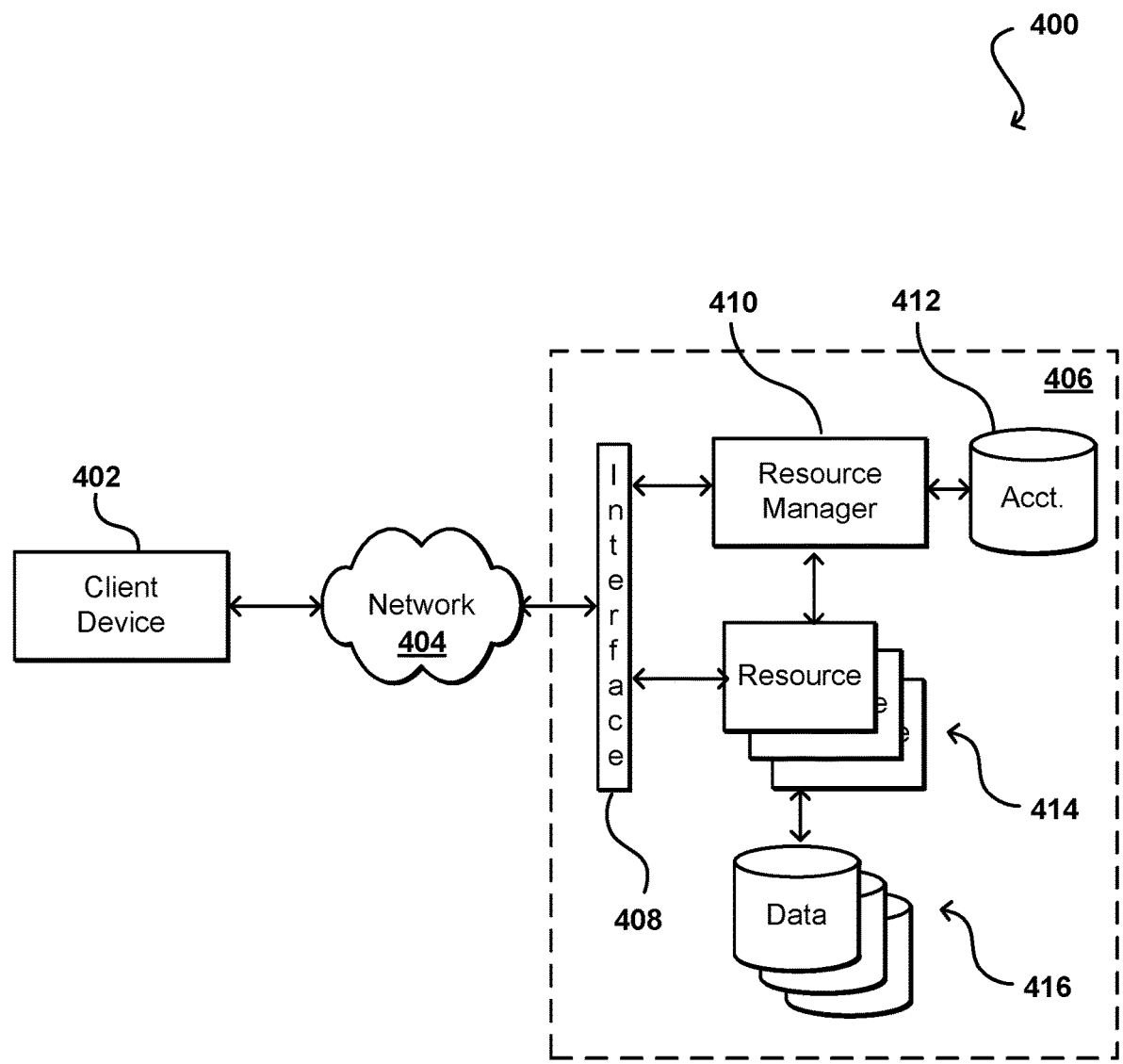
FIG. 4 illustrates an example environment in which various embodiments can be implemented.

FIG. 4 illustrates an example environment 400 in which aspects of the various embodiments can be implemented. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
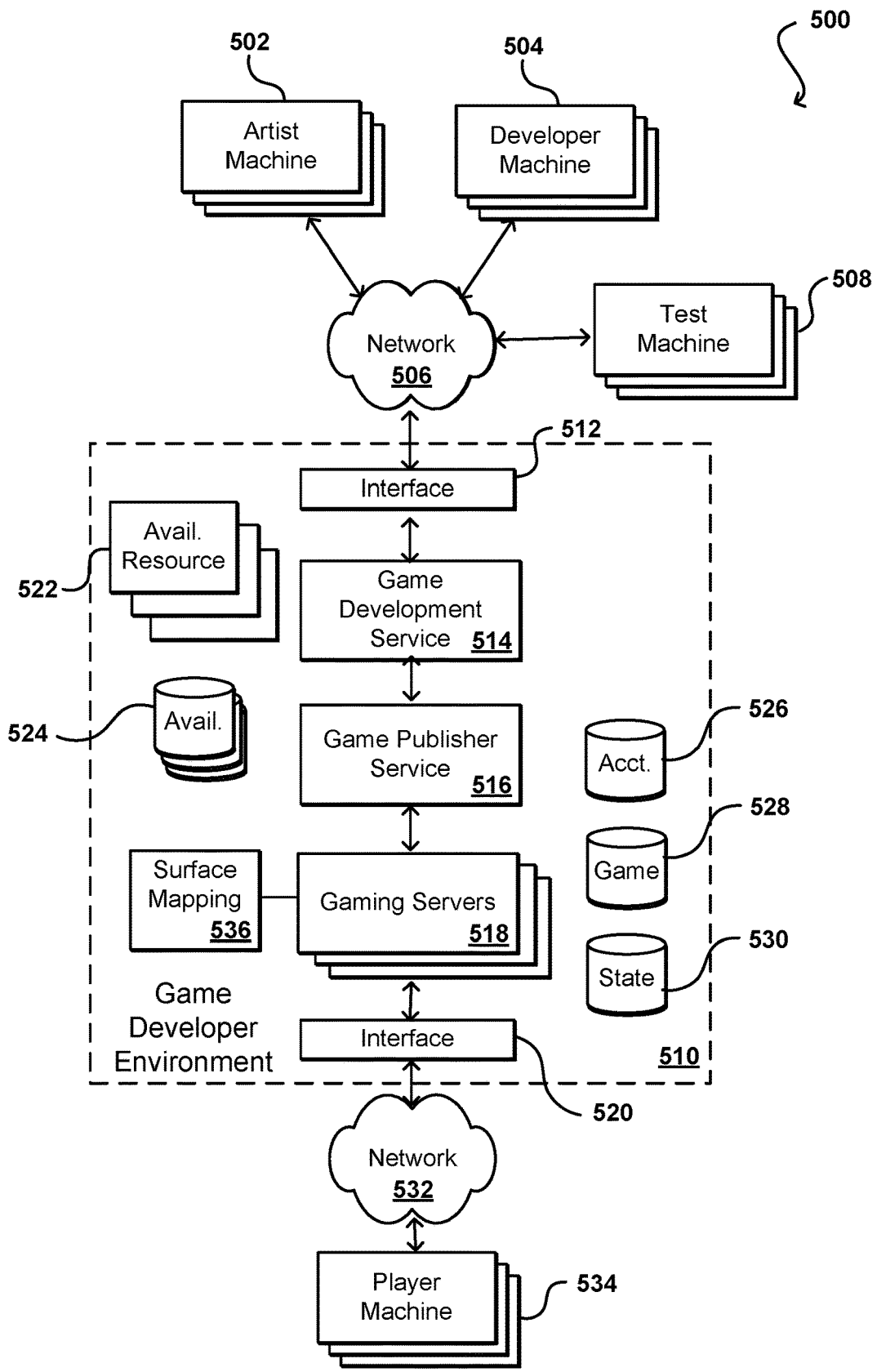
FIG. 5 illustrates an example gaming pipeline that can be used in accordance with various embodiments.

As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in a game developer environment 510, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 506 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. As mentioned, in some embodiments the devices can send position or image data to a dedicated gaming server 518 or other component in the game developer environment 510, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 534 in order for those devices to render the appropriate AR content for the location and orientation of a given device. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the gaming servers 518 or other such systems, services, or components can utilize a surface mapping service 536, for example, that is able to receive position, orientation, and object location data, among other types of data discussed herein, and generate an authoritative mapping of a specific area or region, such as a gameplay region. In this example, each player device 534 can send the information to an allocated gaming server 518 for the gaming session, which can then communicate the relevant information with the surface mapping service 536 so that the surface mapping service can update the authoritative data set as appropriate, as well as to obtain from the mapping service any relevant position or other data that should be sent to one or more devices based on, for example, changes in the orientation or location of the device, as well as for changes of other objects or positions in the mapped region as well. As mentioned, in some embodiments the information can be sent as needed for a current view of a player device, and at least some of that data can be retained in cache or memory on the device such that only changes to the data need to be transmitted, and in some embodiments the devices can each build a model of the mapped region over time. As mentioned, in some embodiments the player devices 534 can communicate with each other as well, such as to send updates in player device location or orientation, or to communicate updates in the authoritative data set, among other such options.

As mentioned, in some embodiments the mapping data for a region can correspond to a set of data points in a defined coordinate system, often referred to as a point cloud. Other representations can be used as well, such as a model or mesh, set of point vectors, etc. In some embodiments a set of geometric shapes for surfaces or objects of interest can be utilized instead or, or along with, a point cloud or other data set. A point cloud can often contain a set of unique or representative data points that are determined for objects in a region or scene that has been imaged or otherwise had data captured by one or more devices. In at least some embodiments point cloud data is captured on the various devices, for relative fields of view, and then aggregated into an authoritative point cloud by the surface mapping service and/or gaming server. The relevant authoritative point cloud data can then be transmitted to the various player devices. In some embodiments, however, the gaming applications executing on the player devices may not be able to directly utilize the point cloud data for rendering, such that geometric primitives or other data is transmitted to the player devices for use in rendering content. In such cases, the point cloud data can be processed by the surface mapping service 536, for example, to generate a useable form such as may correspond to a 2D or 3D mesh, surface model, or set of geometric shapes for specific surfaces, among other such options. In some embodiments a network of triangles for a mesh can be generated using the point cloud, where the relative triangle point data can be transmitted to the relevant player devices. Various processing approaches such as data compression and multiple point sampling can be used as well in accordance with various embodiments.

As mentioned, the data sent by the various player machines can include location and orientation data. This can include, for example, GPS or other position data, combined with orientation data based on gyroscopes, compasses, or other such sensors or devices as discussed herein. The data can also include relative data as may be based upon a beacon or other such communication transmitted between the devices themselves. Beacons in some embodiments can be emitted by a Bluetooth low energy (BLE) or other such device that can broadcast identifiers, or other such information, that can be received by nearby receivers. Such an approach enables portable electronic devices, such as smart phones and tablet computers, to communicate when within a determined proximity. In some embodiments a beacon includes a universally unique identifier that can be interpreted by a compatible application, where the identifier and associated data can be used to determine the physical location of the device. Such an approach can also be used to generate or trigger location-based actions or functionality. Beacons can be useful when in indoor locations where GPS and other positioning approaches may not be as accurate.

In some embodiments the software can analyze data for a scene as captured by one or more devices and attempt to determine specific types of surfaces in the scene, such as flat or substantially horizontal surfaces. The software on some devices can analyze captured image data to identify and track planar surfaces corresponding to objects such as tables and floors, which can be used as reference points for rendering, for example, AR content. In some embodiments data from the camera sensor can also be used to determine an amount of ambient light in order to attempt to properly apply lighting or shading to the rendered objects. In one approach visual-inertial odometry can be used to combine information from the sensors on the device with computer vision analysis of the image data to recognize specific types of features in a scene and track the position across frames of image data. Hit testing can be performed as well in some embodiments to attempt to locate AR anchor positions in the captured image data, for purposes of rendering an AR overlay with respect to one or more of those positions. As mentioned, however, the accuracy of data captured by an individual device can be limited to a relatively small region, such that various embodiments can apply these and other approaches to the data set aggregated from the various devices. In other embodiments, however, the gaming server or surface mapping service 536 can provide the authoritative point data and the analysis of the surfaces and anchor points can be performed on the individual devices, only with respect to the authoritative data instead of the device-specific captured data.

Figure 6:
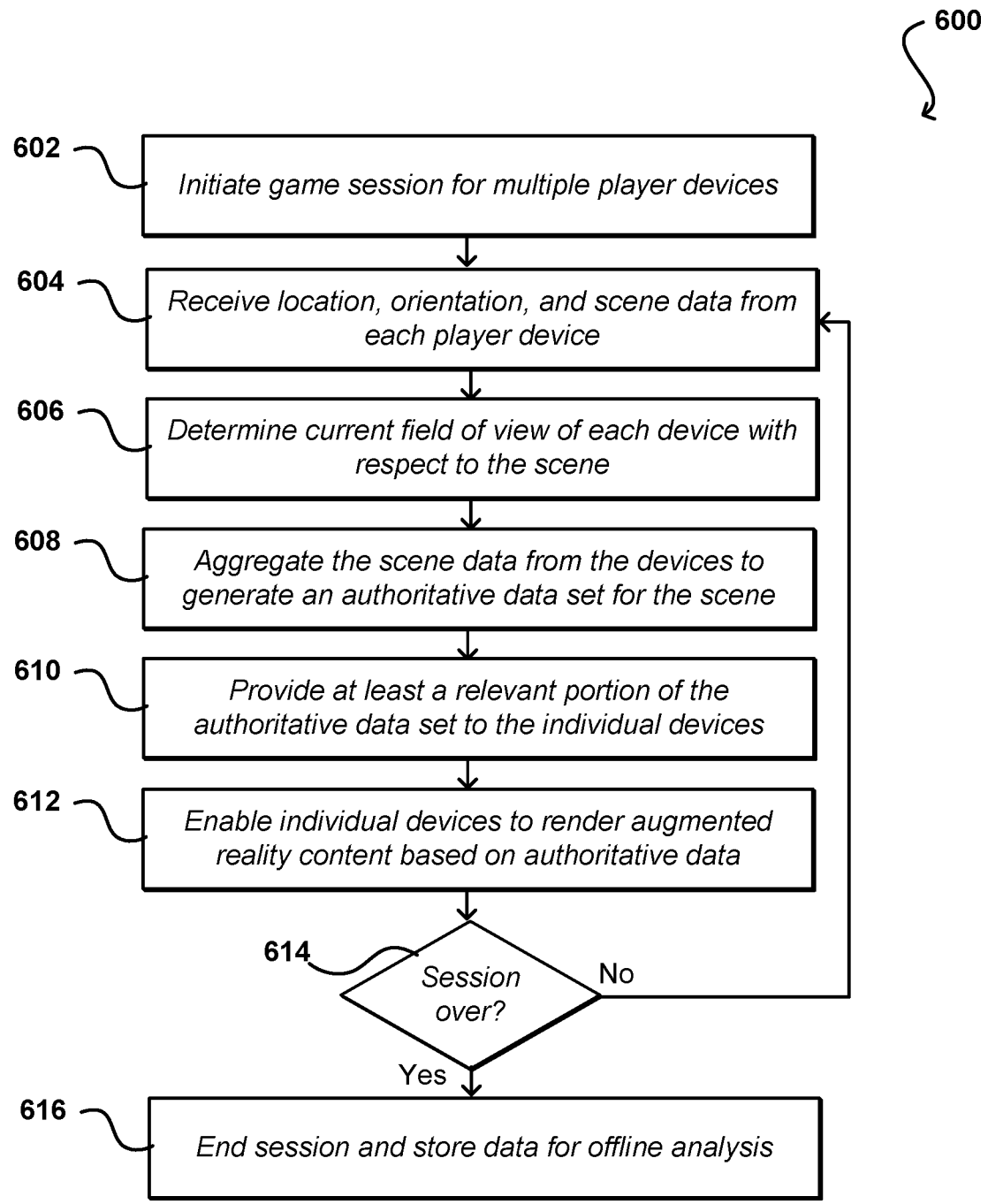
FIG. 6 illustrates an example process for rendering augmented reality content based at least in part upon point cloud data from multiple devices that can be utilized in accordance with various embodiments.

FIG. 6 illustrates an example process 600 for providing augmented reality content for a multi-player gaming application that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, a game session is initiated 602 that will involve multiple player devices. Each device can execute an application, for example, that enables augmented reality (AR) or other such content to be rendered over a live view of image or video content captured by a camera or other image capture component of the respective devices. In some embodiments a session will only begin when a sufficient number (i.e., a minimum number or quorum) of players has joined, while in others a single player may be sufficient to initiate a session. In some embodiments game data will be pushed to each device before the start of the session, while in others data from the various devices will be sent to a dedicated game server after initiation of the session, such as where each device has the application and data for the game installed on the respective devices.

As mentioned, in an AR game or other such application or operation, data about the area surrounding a device will be captured, such as by using at least one camera or sensor to capture data about nearby objects within a field of view of the camera or sensor. While field of view is often used in terms of camera lenses, as used herein "field of view" refers to the area proximate a device in which a sensor is able to capture data about objects or features within that area. Thus, the field of view for a camera or lidar might have an angular range, while an ultrasonic sensor may have a field that is based more on distanced. The data captured by the corresponding sensor(s) can be analyzed to determine the positions (e.g., relative coordinates) of representative points (or other features or aspects) for the various objects in the field of view. The position data can be used to generate a model or representation of the area that can be used to determine a relative positioning and scale of AR content to be rendered with respect to the scene. As mentioned, however, the accuracy of this position data captured by a given device can be limited beyond a certain distance, referred to herein as an accuracy range or threshold of the respective sensor. Thus, it can be desirable to utilize data captured by other nearby devices that may be more accurate for other portions of the area utilized by the game, such as other regions or portions of a gameplay field.

In order to correlate the data from the various player devices for the session, approaches in accordance with various embodiments determine the relative (or absolute) locations and orientations of the various devices with respect to the gameplay area, or "scene" in which the AR content is to be rendered. As mentioned, this can include each device determining (or having determined) location data, such as geo-coordinates from a GPS component or relative coordinates from a beacon or triangulation system, among other such options. The correlation of data points for objects also utilizes the orientation of the various devices, in order to determine field of view and direction of the sensor for point position determining. Sensors such as electronic gyroscopes and compasses can be used to obtain absolute orientation, while sensors such as accelerometers, magnetometers, inertial sensors, and the like can be used to determine changes in orientation, which can be tracked over time. Various other approaches for determining position and/or orientation can be used as well within the scope of the various embodiments.

The location, orientation, and scene data in this example can be received 604 from the various player devices. The data can be received through separate streams or communications, and can be received separately or concurrently. The data can also be received periodically or as appropriate during the gameplay session, such as in response to detected movements or changes in device orientation or gameplay state. In various embodiments the data may be of the same type and on the same scale, but in some embodiments there may need to be some translation or normalizing of the data, such as where the player devices are of different types or running different operating systems, etc. In this example, at least a subset of the data can be analyzed to determine 606 the current field of view of each device with respect to the scene. This can include, for example, determining a position and direction of each device with respect to the scene, such that the relative positions of objects detected by that device can be correctly positioned within the scene. Once the various data is obtained and correlated within the area of the scene, the data can be aggregated 608 and otherwise processed to generate an authoritative data set for the scene. This can include, for example, combining data points from the various devices for object in the scene in order to determine a more accurate representation of the size, shape, and location of that object in the scene. Once obtained, at least a relevant portion of the authoritative data set can be provided 610 to the various individual devices. This can include, for example, sending a portion of the authoritative data set to the device that corresponds to the current field of view of a camera of the device, in order to enable AR content to be rendered with respect to the current field of view. In other embodiments, an attempt can be made to transmit all of the authoritative data set to the devices, with updates being propagated as appropriate. The individual devices can then be enabled 612 to render the augmented reality content based at least in part upon the position data from the authoritative data set, which can provide more accurate positioning that would be possible using data captured by the individual device alone. The process can continue until it is determined 614 that the session is over, at which time the session can be ended 616 and at least some of the gameplay data stored for offline analysis. This can include, for example, determining appropriate accuracies, accuracy distances, and weightings for point combinations, among other such options.

Figure 7:
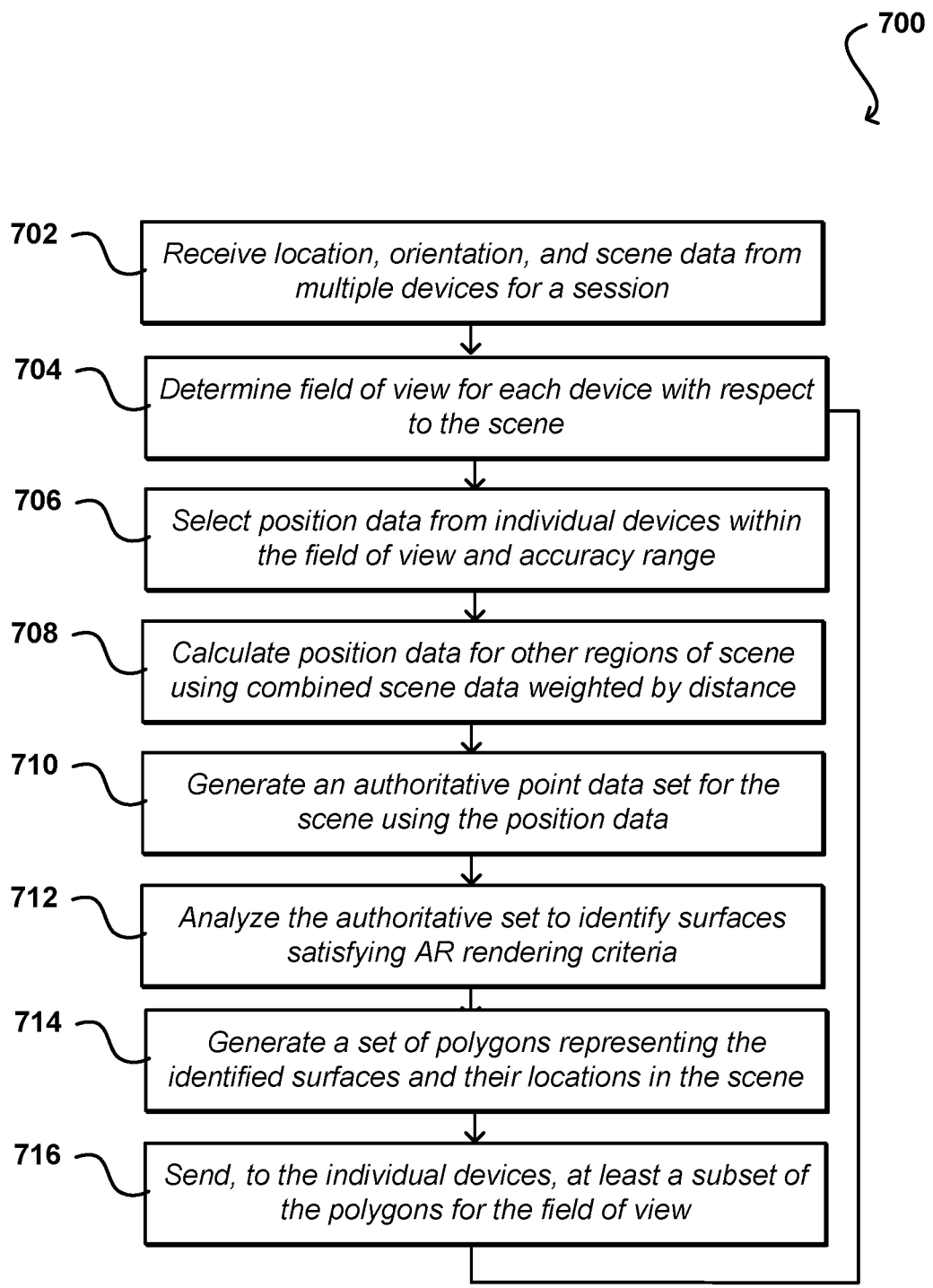
FIG. 7 illustrates an example process for rendering augmented reality content using surface data received from a central server that can be utilized in accordance with various embodiments.

FIG. 7 illustrates an example process 800 for rendering AR content on a computing device that can be utilized in accordance with various embodiments. In this example, location, orientation, and scene data is received 702, or otherwise obtained, for multiple computing devices engaged in an AR session. The data and its receiving can be similar to that described with respect to the process of FIG. 6. Based at least in part upon the data, the field of view for each device with respect to the scene can be determined 704 so that data from each device can be properly correlated to the coordinate system of the scene, such as a gameplay area. In this example, the scene data obtained from a given device that is within an accuracy distance of that device can be determined to be accurate. Accordingly, position data for object points within the field of view and accuracy range of a given device can be selected as authoritative. If an object lies within such a region for two or more devices, then the points can be selected based on proximity to one of the devices, with the shortest distance having priority. For other regions of the scene that are outside a field of view and accuracy distance of at least one device, position data can be calculated 708 or otherwise determined using a combination of scene data weighted by distance. Thus, the data for an object can be a combination of all data points for that object returned by any of the devices, but instead of just taking an average or midpoint, a weighting can be used such that points closer to the respective device that are likely to be more accurate are weighted more heavily than points further from the reporting device. Such an approach should provide a point that is more accurate than those provided by any of the individual devices. The selected and calculated position data for the various objects of the scene can then be used to generate 710 an authoritative point data set for the scene. As mentioned, this can be a set of coordinates with identifying information, or other such data.

The authoritative data set can then be analyzed 712 to identify surfaces, or other regions or objects, that satisfy one or more AR rendering criteria. For example, certain AR applications might search for horizontal surfaces of sufficient size to enable a realistic rendering of an AR character or object at those locations. Similarly, some applications might look for horizontal walls or other surfaces on which to render virtual posters, images, or other such content. In other applications regions of specific size and/or shape may be identified, as may relate to the specific type of AR content to be rendered. For at least some of the identified surfaces, a set of polygons can be generated 714 that represent the identified surfaces and their locations in the scene. This can include, for example, a single polygon of an appropriate shape for a given surface, or a set of triangles forming a similar shape at that location, among other such options. The polygons can each be represented by a set of coordinates or a coordinate vector, among other such options. A respective subset of the determined polygon data can then be sent 716 to the individual devices corresponding to the current field of view of that device, such that the locations, scale, and other aspects of AR content to be rendered in the scene can be determined. As mentioned, in some embodiments polygon data for areas outside the field of view may be sent as well, in order to allow for faster rendering in response to changes in position or orientation of the device. In some embodiments an attempt can be made to send data for the entire scene, with updates then being sent as appropriate so each device can have a full set of up to date authoritative data (except for differences due to latency and processing, etc.).

Figure 8:
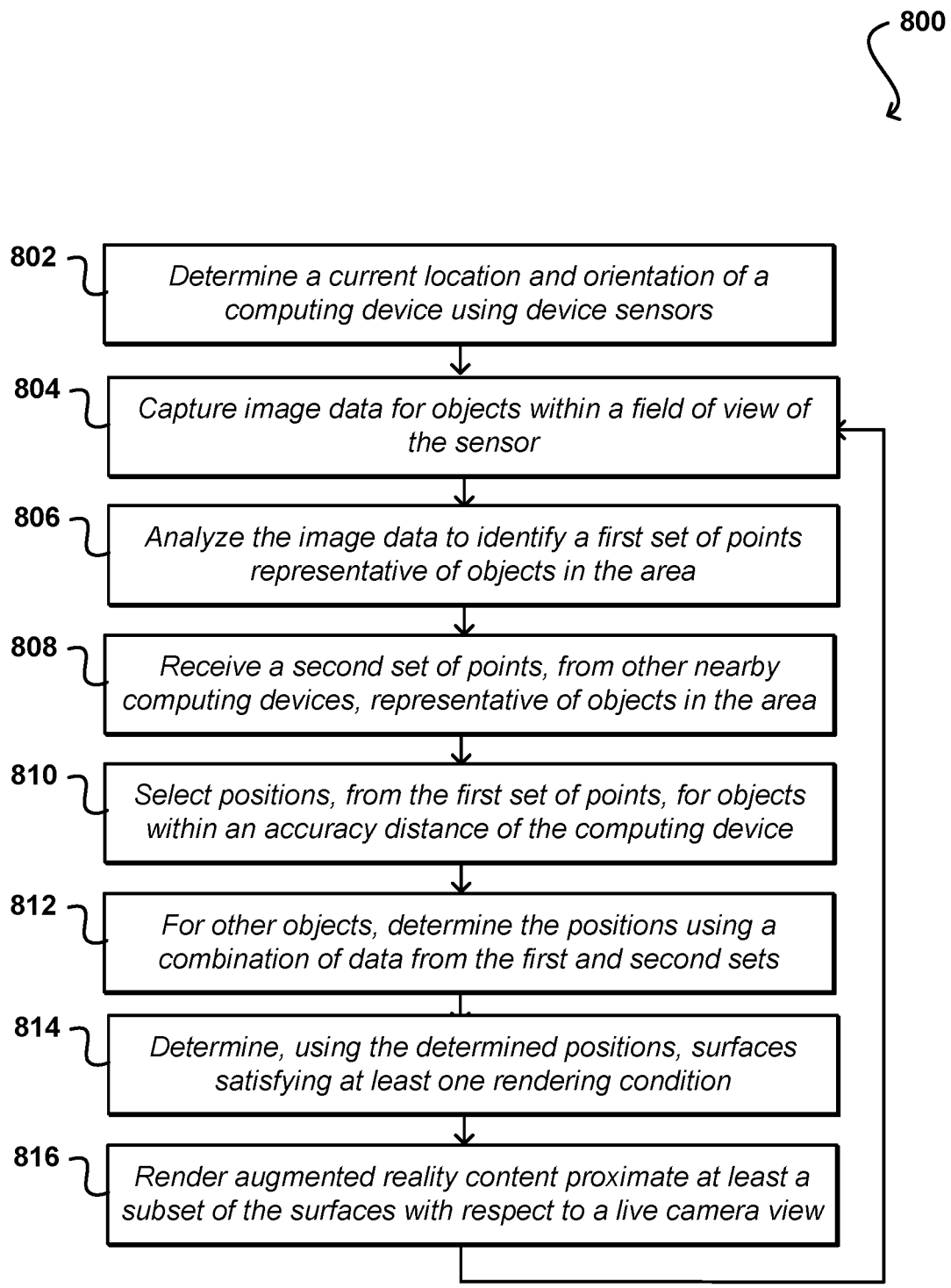
FIG. 8 illustrates an example process for rendering augmented reality content using location data received from other devices that can be utilized in accordance with various embodiments.

FIG. 8 illustrates an example process 800 for obtaining more accurate point data for rendering AR content on a computing device that can be utilized in accordance with various embodiments. In this example, a current location and orientation of a computing device is determined 802, such as by using one or more sensors on the device. Information can also be obtained by external systems, such as may determine a location of a computing device in a gameplay field or other such area for rendering AR content. As mentioned, the device sensors can include components such as GPS subsystems, compasses, gyroscopes, inertial sensors, magnetometers, accelerometers, and the like. In addition, image data is captured 804 (using at least one camera or image sensor) that includes representations of one or more objects contained within a current field of view of the device. The image data can be analyzed 806 (on the device or otherwise) to identify a first set of points representative of objects in the area and within the field of view. In addition, a second set of points is received 808 from one or more nearby computing devices that have also captured image data for at least a portion of the scene and have analyzed the data to determine points representative of the objects, where each point has a corresponding set of coordinates or other location information with respect to the area for AR rendering. In some embodiments at least a portion of the second set of points can be received from a dedicated server or other such source, which may have received data from one or more other devices or sources.

In order to obtain accurate position data for objects in the field of view, data from both the first and second set of points can be utilized. In this example, position for objects within an accuracy distance of the computing device can be selected 810 from the first set of points. As mentioned, position determinations within the accuracy distance can be considered reliable for purposes of AR rendering. For other objects outside or past the accuracy distance from the device sensor, the positions can be determined 812 using a combination of data points received from the other devices or sources. For example, if some data points for these objects are determined to be reliable, or have at least a minimum accuracy or confidence, then the positions for those data points can be selected. Otherwise, the positions of those points can be determined using a function or weighted combination of points as discussed elsewhere herein. These positions can then be determined to be authoritative for at least the objects within the field of view of the computing device. Relevant surfaces can be determined 814 using the determined positions from the authoritative data, where the surfaces satisfy at least one rendering condition or criterion. As mentioned, these criteria can include aspects relating to size, shape, angle, type, and the like. An application executing on the computing device can then render 816 augmented reality content over, or with respect to, a live camera view where the content is positioned proximate the determined surfaces and with a scale corresponding to the distance of that surface from the computing device. Various other approaches for rendering the AR (or other) content based on the determined surfaces can be utilized as well within the scope of the various embodiments.

Figure 9:
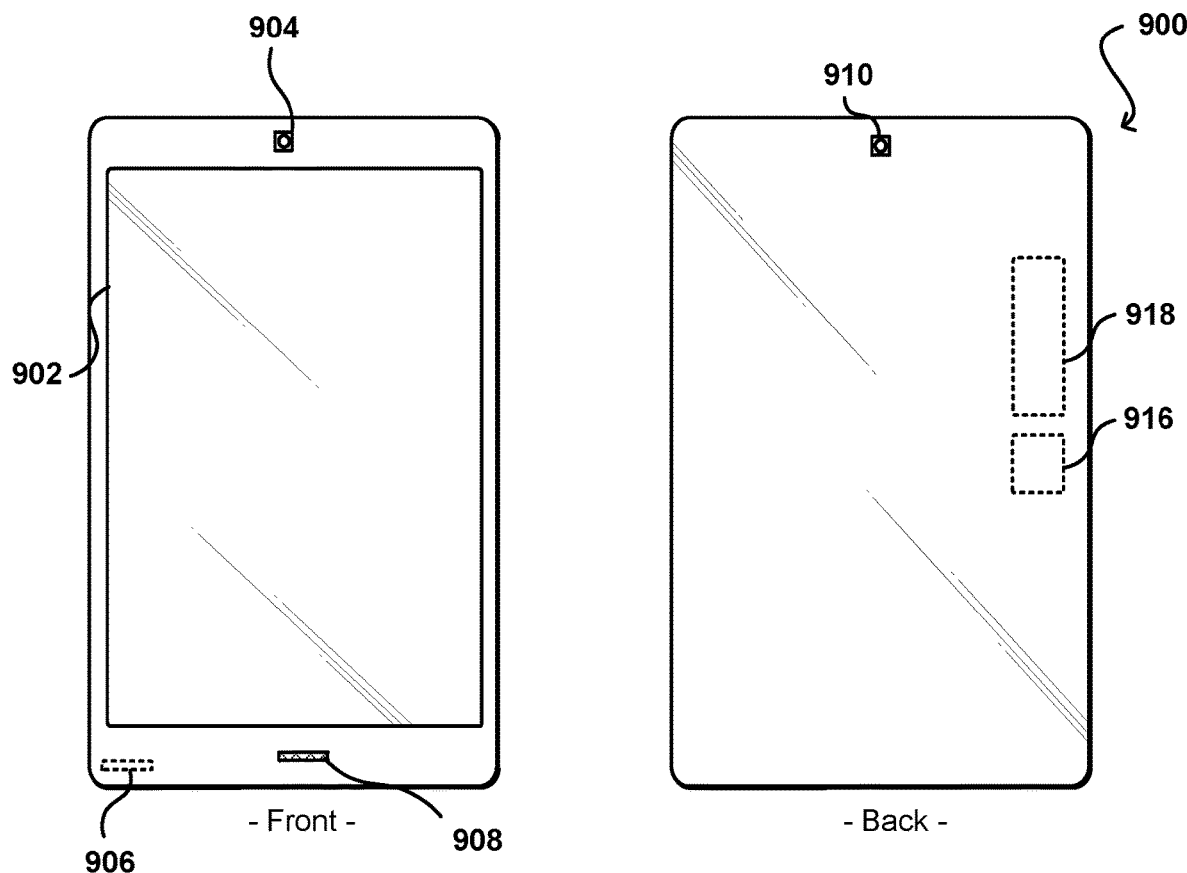
FIG. 9 illustrates an example computing device that can execute a gaming application in accordance with various embodiments.

FIG. 9 illustrates front and back views of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display screen of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 908 on the front side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 906, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
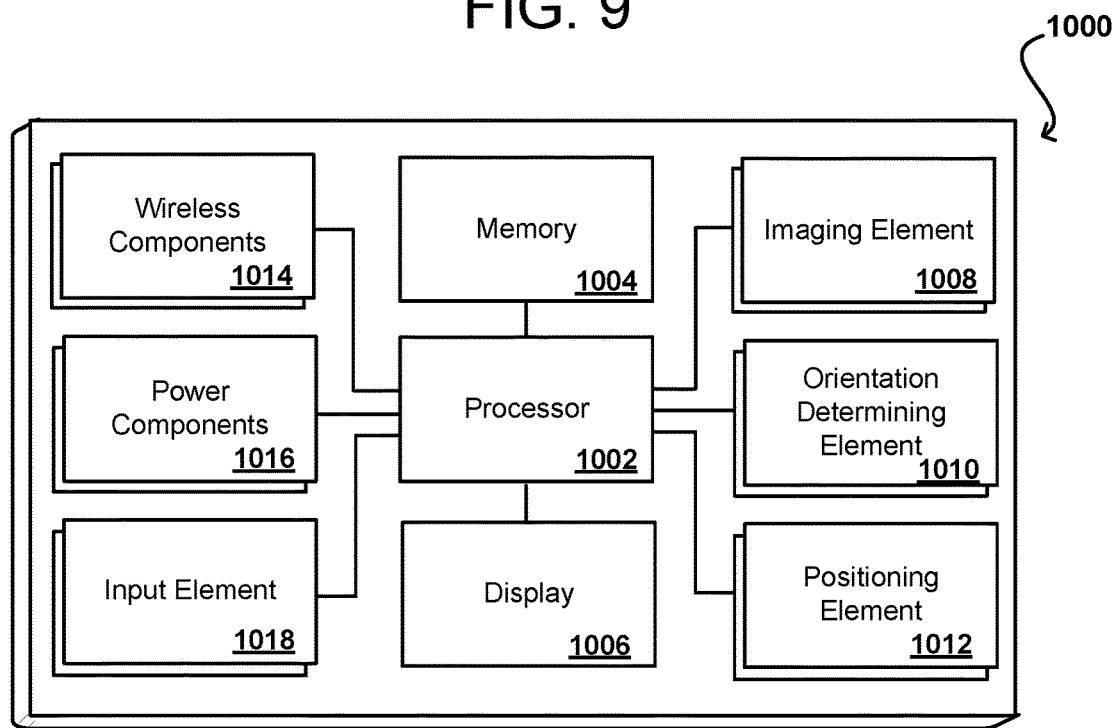
FIG. 10 illustrates example components of a computing device that can be used to implement aspects of the various embodiments.

FIG. 10 illustrates a set of basic components of an electronic computing device 1000 such as the device 1000 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display screen 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving position and orientation data for each of a plurality of computing devices executing an augmented reality (AR) application within a specified geographical region;
receiving, from the plurality of computing devices, first coordinate data for objects identified within the specified geographical region;
determining a first weighting for a first individual instance of the first coordinate data based on:
a distance between a first individual instance and a first device of the plurality of computing devices, the first device having captured the first individual instance; and
a field of view of the first device;
determining a second weighting for a second individual instance of the first coordinate data based on a distance between a second individual instance and a second device of the plurality of computing devices, the second device having captured the second individual instance;
generating an authoritative set of coordinate data for the objects based at least in part upon the individual instances of the first coordinate data, the first weighting, and the second weighting;
analyzing the authoritative set of coordinate data to identify one or more surfaces satisfying an AR rendering criterion;
generating at least one polygon to represent each of the one or more surfaces, the position of the polygon determined at least in part by the individual instances of the first coordinate data, the first weighting, and the second weighting; and
sending information for the at least one polygon to the plurality of computing devices, wherein the plurality of computing devices are each able to render AR content with a size and a location corresponding to the at least one polygon.

2. The computer-implemented method of claim 1, wherein the first coordinate data received from the plurality of computing devices corresponds to point data generated by an analysis of image data captured by the plurality of computing devices.

3. The computer-implemented method of claim 1, further comprising:
determining, based at least in part upon the position and orientation of the respective computing device, a field of view of the respective computing device; and
sending a determined subset of the information for the at least one polygon to the respective computing device, wherein the respective computing device has sufficient information to render AR content over a live video feed corresponding to the field of view.

4. The computer-implemented method of claim 1, further comprising:
enabling the computing devices to utilize the information for the at least one polygon for distances beyond an accuracy distance from the respective computing devices.

5. A computer-implemented method, comprising:
obtaining, from a plurality of computing devices, coordinate data for one or more objects detected in a physical region;
determining a first weighting for a first individual instance of the coordinate data based on:
a distance between a first individual instance and a first device of the plurality of computing devices, the first device having captured the first individual instance; and
a field of view of the first device;
determining a second weighting for a second individual instance of the coordinate data based on a distance between a second individual instance and a second device of the plurality of computing devices, the second device having captured the second individual instance;
aggregating the coordinate data based at least upon the first weighting and the second weighting to generate an authoritative data set corresponding to locations of the objects within a specified region;
determining, for a specified computing device of the plurality of computing devices, a current field of view for which video content of the specified region is captured and displayed on a display element of the specified computing device; and
sending a subset of the authoritative data set to the specified computing device, the subset corresponding to objects at least partially contained within the field of view, wherein the specified computing device is configured to utilize locations of the objects indicated in the subset to render augmented reality content over the video content on the display element, the augmented reality content having a position determined at least in part by the first weighting and the second weighting.

6. The computer-implemented method of claim 5, further comprising:
selecting the coordinate data, for inclusion in the authoritative set, for positions within an accuracy distance of a respective device; and
determining calculated position data, for inclusion in the authoritative set, that is beyond the accuracy distance from the computing devices, the calculated position data determined at least in part upon aggregating the coordinate data from the plurality of computing devices and calculating higher accuracy position data for similar features identified for the physical region.

7. The computer-implemented method of claim 6, further comprising:
analyzing the coordinate data, after the aggregating, to identify the one or more surfaces represented by the coordinate data, the one or more surfaces satisfying at least one selection criterion; and
generating the authoritative data to include coordinates for polygons corresponding to a shape and location of the one or more surfaces.

8. The computer-implemented method of claim 6, further comprising:
enabling the plurality of computing devices to communicate coordinate updates amongst the plurality of computing devices and separate from transmission of the coordinate data or the authoritative data.

9. The computer-implemented method of claim 5, further comprising:
sending at least one additional subset of the authoritative data to the specified computing device, wherein the specified computing device is enabled to render AR content in response to a movement of the specified computing device without first receiving an updated transmission of authoritative data.

10. The computer-implemented method of claim 5, further comprising:
receiving updated coordinate data from at least one of the plurality of computing devices;
updating the authoritative data set based at least in part upon the updated coordinate data; and
transmitting at least a subset of changes to the authoritative data set to one or more of the plurality of computing devices.

11. The computer-implemented method of claim 5, further comprising:
receiving position and orientation data for individual devices of the plurality of computing devices; and
determining relative orientations amongst the individual devices in order to be able to correlate the coordinate data received from the individual devices.

12. A system, comprising:
at least one processor; and
memory including instructions that, when executed by the at least one processor, cause the system to:
obtain, from a plurality of computing devices, coordinate data for one or more objects detected in a specified region;
determine a first weighting for a first individual instance of the coordinate data based on:
a distance between a first individual instance and a first device of the plurality of computing devices, the first device having captured the first individual instance; and
a field of view of the first device;
determine a second weighting for a second individual instance of the coordinate data based on a distance between a second individual instance and a second device of the plurality of computing devices, the second device having captured the second individual instance;
aggregate the coordinate data based at least upon the first weighting and the second weighting to generate an authoritative data set corresponding to locations of the objects within the specified region; and
send at least a subset of the authoritative data set to a specified individual device of the plurality of computing devices, wherein the specified individual device is enabled to utilize locations of the one or more objects from the authoritative data set to render augmented reality content over image content displayed on the specified individual device, the position of the augmented reality content determined at least in part by the individual instances of the coordinate data, the first weighting, and the second weighting.

13. The system of claim 12, wherein the instructions when executed further cause the system to:
determine, for a specified computing device of the plurality of computing devices, a current field of view for which video content of the specified region is captured and displayed on a display element of the specified computing device; and
determine the respective subset based at least in part upon the current field of view.

14. The system of claim 12, wherein the instructions when executed further cause the system to:
select the coordinate data, for inclusion in the authoritative data set, for positions within an accuracy distance of a respective device; and
determine calculated position data, for inclusion in the authoritative data set, that is beyond the accuracy distance from the plurality of computing devices, the calculated position data determined at least in part upon aggregating the coordinate data from the plurality of computing devices and calculating higher accuracy position data for similar features identified for the specified region.

15. The system of claim 12, wherein the instructions when executed further cause the system to:
analyze the coordinate data, after the aggregating, to identify one or more surfaces represented by the coordinate data, the one or more surfaces satisfying at least one selection criterion; and
generate the authoritative data set to include coordinates for polygons corresponding to a shape and location of the one or more surfaces.

16. The system of claim 12, wherein the instructions when executed further cause the system to:
send at least one additional subset of the authoritative data set to the specified computing device, wherein the specified computing device is enabled to render AR content in response to a movement of the specified computing device without first receiving an updated transmission of authoritative data.

17. The system of claim 12, wherein the instructions when executed further cause the system to:
apply weightings to individual instances of the coordinate data before aggregating the coordinate data, the weightings based at least in part upon a respective distance from the specified computing device that captured the individual instances.

18. The system of claim 12, wherein the instructions when executed further cause the system to:
receive updated coordinate data from at least one of the plurality of computing devices;
update the authoritative data set based at least in part upon the updated coordinate data; and
transmit at least a subset of changes to the authoritative data set to one or more of the plurality of computing devices.

* * * * *